(12) United States Patent
Azema

(10) Patent No.: US 7,562,762 B2
(45) Date of Patent: Jul. 21, 2009

(54) ROTARY TRANSFER DEVICE WITH FINGER MOVING ON A CAM-FORMING PATH

(75) Inventor: André Azema, Saix (FR)

(73) Assignee: Comau Systemes France, Trappes (FR)

( * ) Notice: Subject to any disclaimer, the term of this patent is extended or adjusted under 35 U.S.C. 154(b) by 341 days.

(21) Appl. No.: 11/571,681

(22) PCT Filed: Jul. 5, 2005

(86) PCT No.: PCT/FR2005/050546

§ 371 (c)(1), (2), (4) Date: Jan. 20, 2007

(87) PCT Pub. No.: WO2006/005888

PCT Pub. Date: Jan. 19, 2006

(65) Prior Publication Data

US 2007/0272517 A1    Nov. 29, 2007

(30) Foreign Application Priority Data

Jul. 8, 2004    (FR)    .................................. 04 07643

(51) Int. Cl.
*B65G 47/24*    (2006.01)

(52) U.S. Cl. .................................. 198/379; 198/377.1

(58) Field of Classification Search ................. 198/379, 198/340, 341.01, 341.03, 377.1, 406
See application file for complete search history.

(56) References Cited

U.S. PATENT DOCUMENTS

| | | | | | |
|---|---|---|---|---|---|
| 4,295,903 | A | * | 10/1981 | Farfaglia | ..................... 118/318 |
| 4,323,158 | A | * | 4/1982 | Wheaton et al. | ............ 198/379 |
| 4,640,406 | A | * | 2/1987 | Willison | ..................... 198/379 |
| 5,498,132 | A | * | 3/1996 | Carozza et al. | ........... 416/97 R |
| 5,566,466 | A | * | 10/1996 | Hearne | ....................... 198/379 |
| 5,711,411 | A | * | 1/1998 | Zurweller | ................... 198/379 |

\* cited by examiner

*Primary Examiner*—James R Bidwell
(74) *Attorney, Agent, or Firm*—Jackson Patent Law Office

(57) ABSTRACT

An exemplary device, for the support and rotary transfer of one or more parts, is integral with an operating shaft whose movement is brought about by the relative displacement of a transverse finger connected to the shaft on a cam-forming path. The exemplary device includes a means for moving the operating shaft translationally, which is free in axial rotation and equipped with a finger extending radially, which moves along a stationary path so that the translational movement of the shaft also ensures its rotation via the passage of the finger inside of the path, the finger moving inside a shaped track provided in a stationary cylinder called a cam cylinder, inside of which the operating shaft moves.

8 Claims, 4 Drawing Sheets

ROTARY TRANSFER DEVICE WITH FINGER MOVING ON A CAM-FORMING PATH

FIELD OF APPLICATION OF THE INVENTION

This invention relates to the field of the handling and movement of parts, and in particular to adaptations enabling rotary movement of a part(s)-holding device under the best of conditions.

DESCRIPTION OF THE PRIOR ART

Part(s)-holding, palletizer or transfer devices are used to ensure the movement of parts, according to a production process, from one work station to another.

In certain configurations, the transfer movement consists of a simple rotary movement of the part from one station to another. However, this rotational movement is conventionally accompanied by translational movements in order to disengage or engage the part or the part(s)-holding device in relation to means for receiving, positioning and/or holding in place.

The palletizer systems of the prior art are constituted by several actuators for ensuring the rotary movement of the part(s)-holding pallets. Thus, it is conventional to carry out an upward translational movement of the part(s)-holding sub-assembly by means of a first disengagement actuator, prior to carrying out the rotational movement by means of a second actuator, and to then command the first actuator to position the moving assembly set in the new station.

This multiplication of components requires a plurality of sensors for each movement broken down. This multiplication of sensing means has the disadvantage of lengthening the duration of the cycle time for the rotary transfer operation.

Furthermore, the multiplication of the various functional sub-assemblies, actuators as well as sensors, increases the cost of such a device.

BRIEF DESCRIPTION OF THE INVENTION

Based on this established fact, the applicant conducted research aiming to eliminate the disadvantages of the prior art.

This research culminated in the design and production of a rotary transfer device for parts having not only a reduced number of actuators but also a shorter cycle time.

According to the invention, the simplified device for rotary transfer of part(s) is remarkable in that it is constituted by a part(s)-holding sub-assembly which, ensuring the support and rotary transfer of one or more parts, is integral with an operating shaft whose movement is brought about by the relative displacement of at least one finger extending radially from the shaft on a cam-forming path. The disengagement and rotation of the part-holding sub-assembly are thus ensured by one and the same actuator. As a matter of fact, by using a cam, the movement of said finger in the path will ensure that said operating shaft moves along two axes, thereby permitting not only translational movements to be carried out, in order to disengage or engage the part(s)-holding sub-assembly, but also to ensure the rotational movement required for transferring the parts from one position to another.

According to one particularly advantageous characteristic of the invention, the device is constituted by a means for moving the operating shaft translationally, which is free in axial rotation and equipped with a radially extending finger that moves along a stationary path so that the translational movement of the shaft also ensures its rotation via the passage of said finger inside of said path. The transformed translational and rotational movement is thus brought about by a single means for translational movement.

According to another particularly advantageous characteristic of the invention, said finger moves inside of a shaped track made in a stationary cylinder called a cam cylinder, inside of which said operating shaft moves in a combined translational and rotational movement.

According to one particularly advantageous characteristic of the invention, the path is preformed so that the operating shaft carries out the following movements in a round trip cycle:

an upward translational movement,
a combined translational and rotational movement, then
a downward translational movement.

Since the end of the operating shaft is fastened to the part(s)-holding sub-assembly, the latter follows the same movements. The creation of a path which, at the beginning and end of the cycle, permits an axial translational movement of the operating shaft, for disengagement purposes, is particularly important to the application of the invention, which requires disengaging and engaging movements. However, for certain applications, it is possible that a lateral movement of the parts may be required at the end and beginning of the transfer stroke. Thus in order to meet this requirement, the path will be arranged so that the finger and, as a result, the parts, are able to follow such a lateral movement.

According to another particularly advantageous characteristic of the invention, the part(s)-holding sub-assembly is constituted by a plate whose two opposing sides are each provided with a preformed cradle for receiving a crankshaft.

According to another particularly advantageous characteristic of the invention, the means for translational movement is a jack.

The translational movement of the jack ensures translational movement of said rod and thus the movement of the finger associated with it, inside of a track provided in a cylinder, a movement that simultaneously brings about the rotation of said rod, making it possible to cause the part(s)-holding sub-assembly associated with the rod (in this case a crankshaft holder) to alternately follow an upward translational movement, a rotational movement, and then a downward translational movement.

Thus, for the same function, this device has the advantage of using fewer actuators and fewer sensors, thereby rendering it less costly and faster, and thereby solving the disadvantages of the prior art.

The fundamental concepts of the invention having just been stated above in their most basic form, other details and characteristics will appear more clearly upon reading the following description and with reference to the appended drawings which, for non-limiting illustrative purposes, provide one embodiment of a device according to the invention.

DESCRIPTION OF THE PREFERRED EMBODIMENTS

Figure 1:
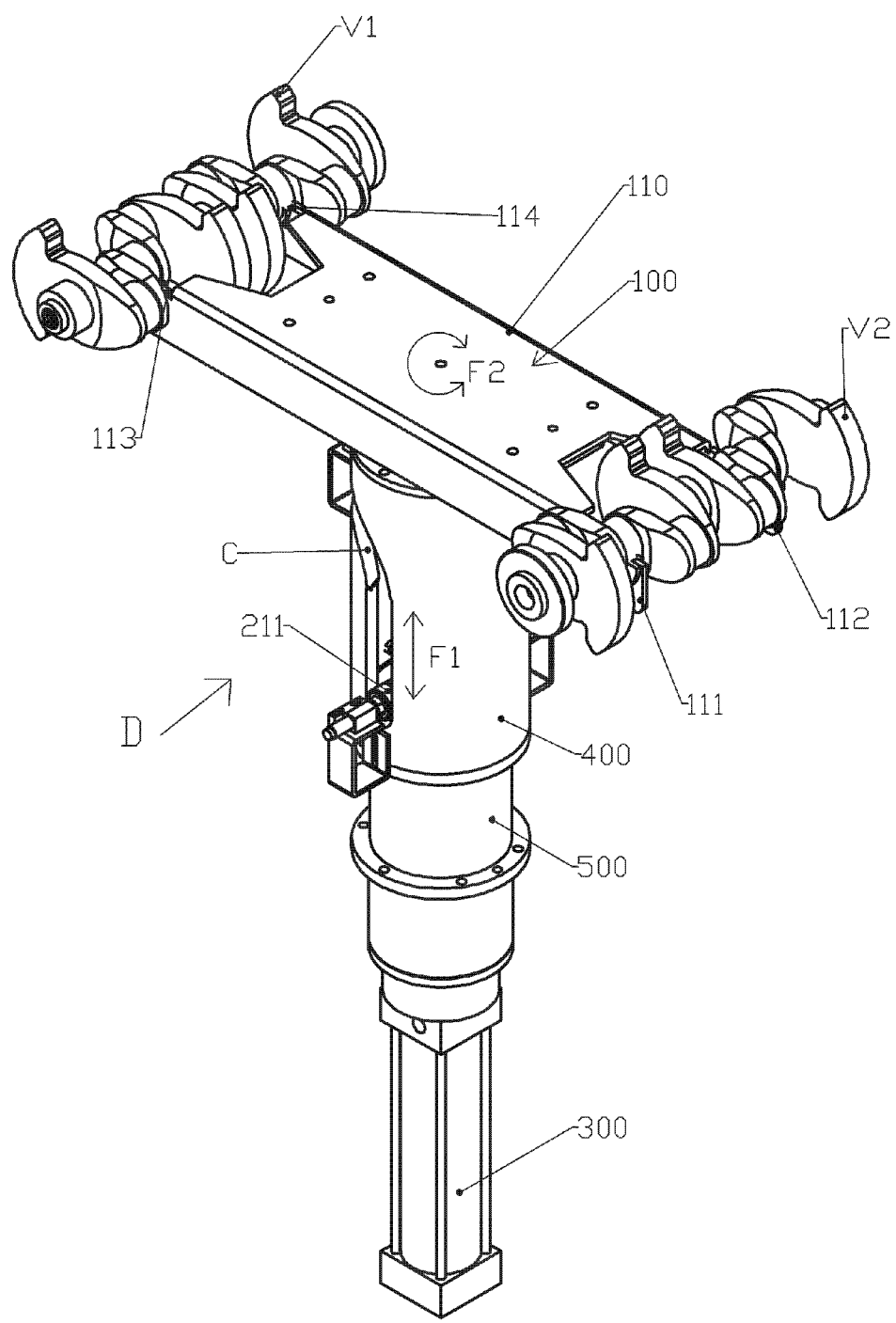
FIG. 1 is a schematic drawing of an exterior perspective view of an embodiment of the device of the invention.
Figure 2:
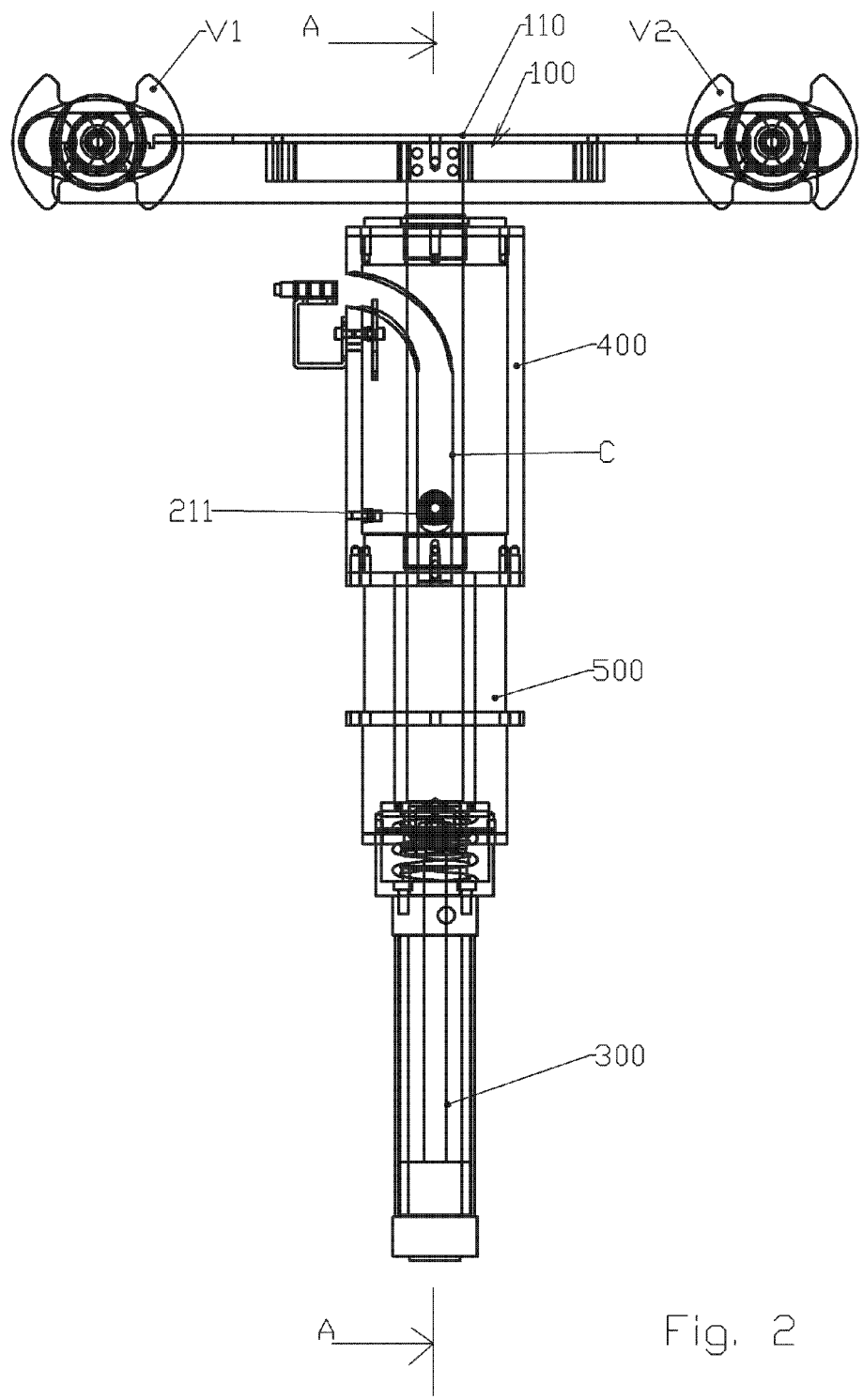
FIG. 2 is a schematic drawing of an exterior side view of the embodiment shown in FIG. 1.
Figure 3:
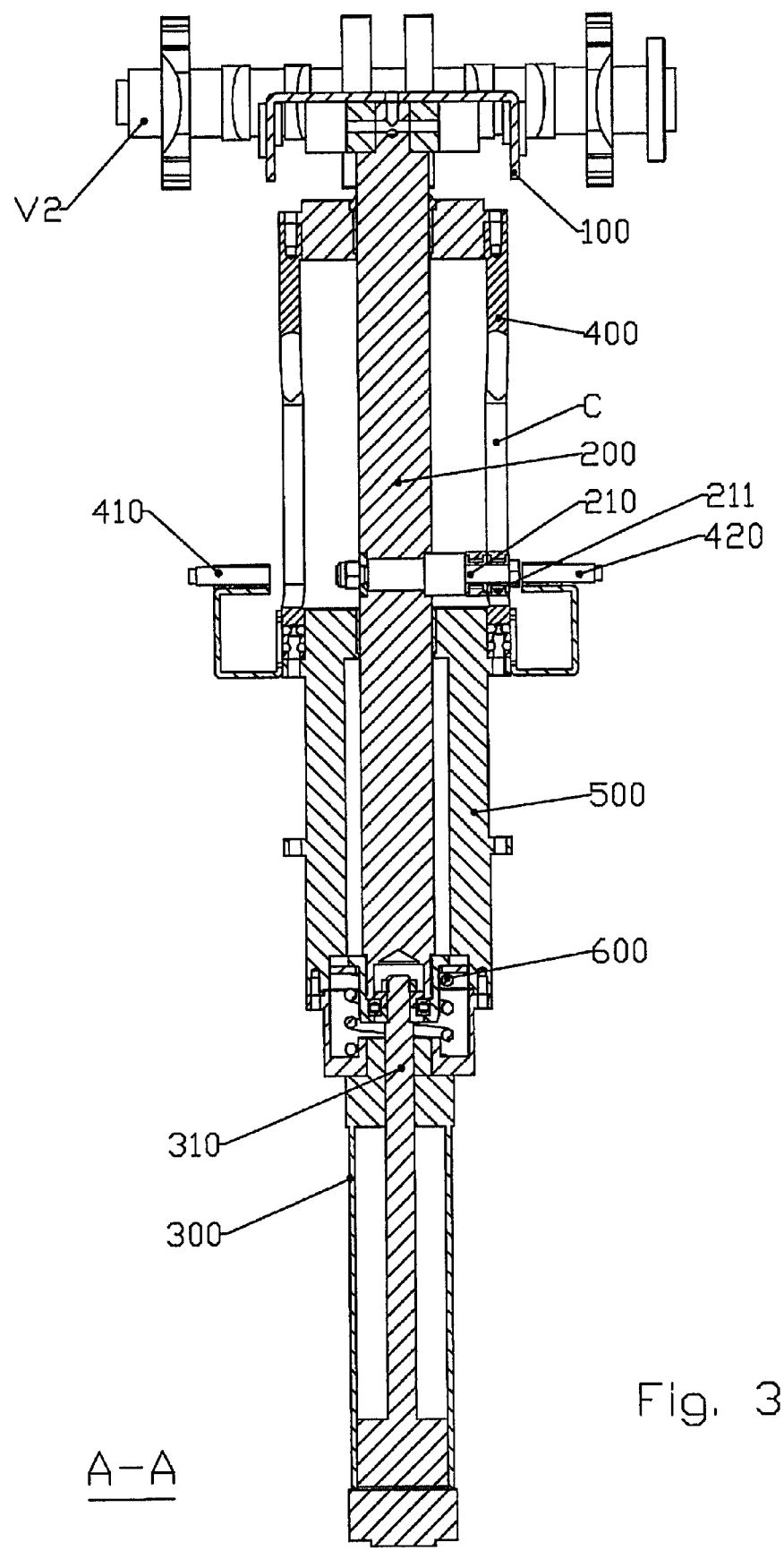
FIG. 3 is a schematic drawing of a sectional front view along the cutting plane AA shown in FIG. 2.

As illustrated in the drawing of FIGS. 1, 2, and 3, the rotary transfer device of the invention, referenced as D in its entirety, is designed for the rotary transfer of crankshafts, referenced as V1 and V2. This device D can be installed, for example, between a balancing station and an unbalance measuring station.

This device D is constituted by a part(s)-holding sub-assembly 100, which provides support for the crankshafts V1 and V2. This part(s)-holding sub-assembly 100 is fastened to the end of an operating shaft 200 whose combined translational and rotational movements, shown by the double arrows F1 and F2, are brought about by the relative displacement of at least one finger 210 extending radially from the shaft 200 on a cam-forming path referenced as C. The part(s)-holding sub-assembly 100 is constituted by a plate 110 whose two opposing sides are each provided with a cradle each constituted by two preformed bearings 111, 112, and 113, 114 for receiving the crankshafts V1 and V2.

As shown and in accordance with the invention, the device D is constituted by a means for translational movement, in this case a jack 300, whose rod re-entry and exit controls the translational movement of the operating shaft 200, which, according to the invention, is free in axial rotation and equipped with a finger 210 extending radially, which moves along a stationary path C so that the translational movement of the shaft 200 also ensures its rotation via the passage of the finger 210 inside of said path C.

As shown, said finger 210, which extends radially in relation to the operating shaft, moves, under the action of the jack, inside of a patch C forming a track or shaped channel made in a stationary cylinder 400 called a cam cylinder, inside of which said operating shaft 200 moves.

As shown, the end of the rod 310 of the jack 300 forms a pin joint with the bottom end of said operating shaft 200, which forms a sliding pin joint with the cam cylinder 400.

More precisely, according to the non-limiting embodiment shown, the device D includes, from bottom to top, a jack 300 whose rod 310 controls the translational movement of the operating shaft 200, which has a sliding pin-type connection with a column 500 whose bottom portion is stationary in relation to the body of the jack 300 and whose top portion is fastened to the cam cylinder 400.

The translational displacement of the operating shaft 200 obliges the finger 210 to follow the path C, a linear displacement transforming the translational movement of the shaft into a combined movement also involving rotation.

According to the embodiment shown, said finger 210 is equipped at its end with a roller 211, which comes into contact with the path C provided in the cylinder 400, in order to facilitate the displacement thereof.

Figure 4:
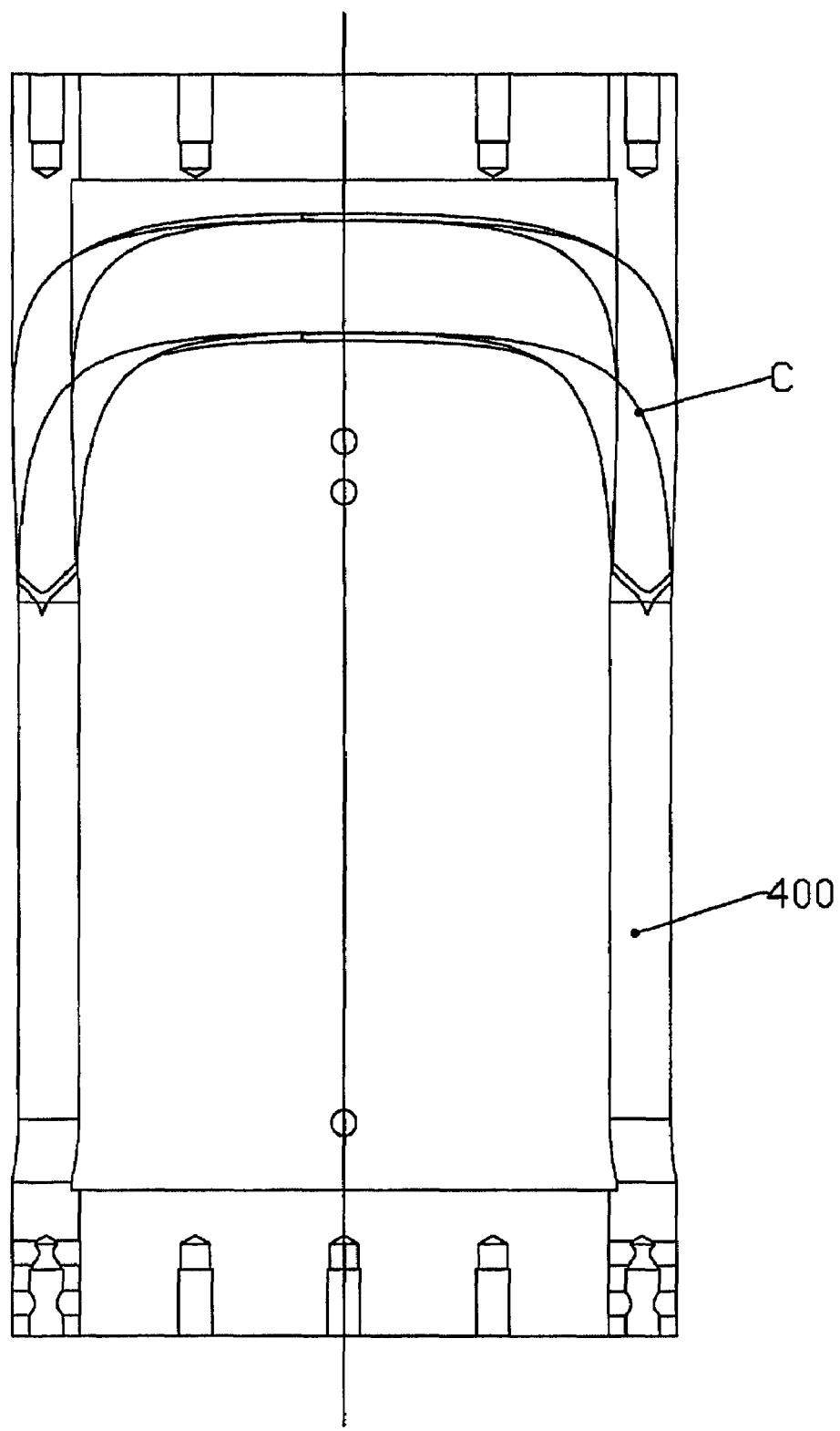
FIG. 4 is a schematic drawing of an exterior front view of the cam cylinder.

According to the invention, and as shown in the drawings of FIGS. 2 and 4, the path C is preformed so that the operating shaft 200 carries out the following movements during its cycle:
- an upward translational movement,
- a combined translational and rotational movement, then
- a downward translational movement.

Thus, with a single actuator, i.e., the jack 300, the device D ensures the two types of movement required for the rotary transfer of parts.

As shown, the path C provided in the cam cylinder 400 is broken down into several portions:
- two vertical portions whose length is sufficient to enable the crankshafts to be disengaged from the top,
- an elliptical portion in the middle of which is located the plane of symmetry of the path C and the highest point of the finger's 210 travel, this elliptical portion being arranged between the two vertical portions.

The elliptical portion and the two vertical portions are arranged in relation to each other in order to enable an alternating round trip rotational movement at an angle of 180°. Of course, depending on the application, the path C can adopt a different geometry and enable shorter or longer travels in comparison to the one shown. In the same way, the number of fingers and the number of paths depend on the angle that the part(s)-holding sub-assembly must produce.

According to the invention, the device is equipped at the cam cylinder 400 with sensors 410 and 420 for the end-of-travel position of said finger 210. These sensors are thus arranged at the bottom end of the vertical portions of the path C made in the cam cylinder 400.

According to a preferred embodiment, the jack 300 is of the single-acting type and only the upward movement is motorised, while the downward movement is produced by the inertia of the part-holding assembly. Thus, the exiting of the rod ensures half of the stroke and then kinetic energy of the rotating sub-assembly ensures that said finger 210 passes beyond the top end of the path C, thereby allowing its downward displacement, due to its weight, and consequently its rotation and return to bottom position. According to one preferred embodiment, the jack is of the pneumatic type, which contributes to the velocity of the moving member constituted by the parts-holding sub-assembly.

According to another characteristic of the invention, the device D is equipped with a double acting jack and with a mid-travel position sensor for said finger 210, in order to ensure dampening at the end of the downward translational movement.

In order to propose a position intermediate between the top position and the bottom position, an elastic means 600 is associated with the operating shaft 200 so that, when the pressure is released inside the jack 300, the spring brings the operating shaft 200, and thus the part(s)-holding sub-assembly 100, into a position situated between the bottom stroke position and the top stroke position. The use of this spring makes it possible to propose an intermediate position at the start and end of stroke, without using additional actuators.

It is understood that the simplified device for rotary transfer of parts has just been described and shown above with a view to disclosure rather than limitation. Of course, various arrangements, modifications and improvements may be introduced with regard to the above example, without necessarily exceeding the scope of the invention.

The invention claimed is:

1. Simplified device for rotary transfer of part(s), of the type comprising a part(s) holding sub-assembly which, ensuring the support and rotary transfer of one or more parts, is integral with an operating shaft whose movement is brought about by the relative displacement of a transverse finger connected to the shaft on a cam-forming path, characterised by the fact that it comprises a means for moving the operating shaft translationally, which is free in axial rotation and equipped with a finger extending radially, which moves along a stationary path so that the translational movement of the shaft also ensures its rotation via the passage of the finger inside of said path, said finger moving inside a shaped track provided in a stationary cylinder called a cam cylinder, inside of which said operating shaft moves.

2. Device according to claim 1, characterised by the fact that the means for translational movement is a jack.

3. Device according to claim 1, characterised by the fact that the path is preformed so that the operating shaft carries out the following movements during its cycle:
   an upward translational movement,
   a combined translational and rotational movement, then
   a downward translational movement.

4. Device according to claim 1, characterised by the fact that it is equipped with sensors for the end-of-travel position of said finger.

5. Device according to claim 2, characterised by the fact that it is equipped with a double acting jack and a mid-travel position sensor for said finger, in order to ensure dampening at the end of the downward translational movement.

6. Device according to claim 1, characterised in that the part(s)-holding sub-assembly comprises a plate whose two opposing sides are each provided with preformed cradle for receiving a crankshaft.

7. Device according to claim 2, characterised by the fact that the end of the rod of the jack forms a pin joint with the bottom end of said operating shaft, which forms a sliding pin joint with the cam cylinder.

8. Device according to claim 2, characterised in that an elastic means is associated with the operating shaft so that, when the pressure is released inside the jack, the spring brings the operating shaft, and thus the part(s)-holding sub-assembly, into a position situated between the bottom stroke position and the top stroke position.

* * * * *